(12) United States Patent
Kochelek et al.

(10) Patent No.: US 10,077,860 B2
(45) Date of Patent: Sep. 18, 2018

(54) INERTING GAS VENT ASSEMBLY, INERTING SYSTEM USING THE GAS VENT ASSEMBLY AND METHOD OF INERTING A FIRE PROTECTION SPRINKLER SYSTEM

(71) Applicant: ENGINEERED CORROSION SOLUTIONS, LLC, St. Louis, MO (US)

(72) Inventors: Jeffrey T. Kochelek, Creve Coeur, MO (US); Kenneth Jones, Barto, PA (US); Adam H. Hilton, Chesterfield, MO (US)

(73) Assignee: Engineered Corrosion Solutions, LLC, St. Louis, MO (US)

( * ) Notice: Subject to any disclaimer, the term of this patent is extended or adjusted under 35 U.S.C. 154(b) by 369 days.

(21) Appl. No.: 14/349,222

(22) PCT Filed: Oct. 3, 2012

(86) PCT No.: PCT/US2012/058567
§ 371 (c)(1),
(2) Date: Apr. 2, 2014

(87) PCT Pub. No.: WO2013/052551
PCT Pub. Date: Apr. 11, 2013

(65) Prior Publication Data
US 2015/0034170 A1 Feb. 5, 2015

Related U.S. Application Data

(60) Provisional application No. 61/544,462, filed on Oct. 7, 2011.

(51) Int. Cl.
*A62C 35/00* (2006.01)
*F16L 45/00* (2006.01)
(Continued)

(52) U.S. Cl.
CPC .............. *F16L 45/00* (2013.01); *A62C 35/58* (2013.01); *A62C 35/62* (2013.01); *A62C 35/645* (2013.01);
(Continued)

(58) Field of Classification Search
CPC ......... A62C 35/62; A62C 35/58; A62C 35/64; A62C 35/645; A62C 35/68
(Continued)

(56) References Cited

U.S. PATENT DOCUMENTS

2002/0121381 A1   9/2002 Reilly
2006/0118181 A1   6/2006 Landon
(Continued)

FOREIGN PATENT DOCUMENTS

JP   2008073227 A   4/2008

OTHER PUBLICATIONS

International Preliminary Report on Patentability from corresponding Patent Cooperation Treaty Patent Application No. PCT/US2012/058567 dated Apr. 17, 2014.
(Continued)

*Primary Examiner* — Alexander Valvis
(74) *Attorney, Agent, or Firm* — Harness, Dickey & Pierce, P.L.C.

(57) ABSTRACT

A fire protection sprinkler system and method of inerting a fire protection sprinkler system includes connecting an inerting system to the piping network of a fire protection sprinkler system having a piping network and at least one sprinkler head connected with the piping network. The inerting system includes an inert gas source that is adapted to supply inert gas to the piping network and an inerting gas vent assembly. The gas vent assembly has a gas vent adapted to discharge gas, a solenoid and a control. The solenoid is adapted to selectively open the gas vent and to close the gas
(Continued)

vent. The gas vent discharges gas when the solenoid opens the gas vent and does not discharge gas when the solenoid closes the gas vent. The control is adapted to operate the solenoid in a manner that allows the gas vent to discharge gas for a limited amount of time.

26 Claims, 2 Drawing Sheets

(51) Int. Cl.
  *A62C 35/58* (2006.01)
  *A62C 35/68* (2006.01)
  *A62C 35/62* (2006.01)
  *A62C 35/64* (2006.01)
  *A62C 99/00* (2010.01)

(52) U.S. Cl.
  CPC .......... *A62C 35/68* (2013.01); *A62C 99/0018* (2013.01); *Y10T 137/0419* (2015.04); *Y10T 137/4245* (2015.04)

(58) Field of Classification Search
  USPC .................................. 169/16–18; 137/552.7
  See application file for complete search history.

(56) References Cited

U.S. PATENT DOCUMENTS

| 2010/0065287 | A1 | 3/2010 | Burkhart et al. |
| 2010/0263882 | A1 | 10/2010 | Bodemann |
| 2011/0094758 | A1 | 4/2011 | Burkhart et al. |
| 2011/0226495 | A1 | 9/2011 | Burkhart et al. |

OTHER PUBLICATIONS

International Search Report and Written Opinion of the International Searching Authority from corresponding Patent Cooperation Treaty (PCT) Application No. PCT/US12/58567, dated Mar. 22, 2013.

INERTING GAS VENT ASSEMBLY, INERTING SYSTEM USING THE GAS VENT ASSEMBLY AND METHOD OF INERTING A FIRE PROTECTION SPRINKLER SYSTEM

CROSS REFERENCE TO RELATED APPLICATION

This application claims the priority benefits of International Patent Application No. PCT/US2012/058567, filed on Oct. 3, 2012, which claims priority from U.S. provisional patent application Ser. No. 61/544,462, filed on Oct. 7, 2011, the disclosures of which are hereby incorporated herein by reference in their entirety.

BACKGROUND OF THE INVENTION

The present invention is directed to an inerting system and method for a fire protection sprinkler system and an inerting gas vent assembly used with such system and method.

Inerting systems for fire protection sprinkler systems add an inert gas to the piping network of the fire protection sprinkler system in order to displace air in the piping network. Because oxygen in the air causes corrosion of the piping network, reduction of the oxygen should reduce corrosion. The present assignee in prior U.S. Patent Application Publication No. 2010/0065287 A1 published on Mar. 18, 2010, by David J. Burkhart et al., the disclosure of which is hereby incorporated herein by reference, taught the use of a vent in order to vent gas from the piping network in order to allow the inert gas to replace air in the piping network.

SUMMARY OF THE INVENTION

The present invention provides a compact vent assembly and method that can be used with the piping network of a fire protection sprinkler system along with an inert gas source in order to more effectively reduce corrosion in the piping network.

A fire protection sprinkler system and method of inerting a fire protection sprinkler system, according to an aspect of the invention, includes connecting an inerting system to the piping network of a fire protection sprinkler system having a piping network and at least one sprinkler head connected with the piping network. The inerting system includes an inert gas source that is adapted to supply inert gas to the piping network and an inerting gas vent assembly. The gas vent assembly has a gas vent adapted to discharge gas, a solenoid and a control. The solenoid is adapted to selectively open the gas vent and to close the gas vent. The gas vent discharges gas when the solenoid opens the gas vent and does not discharge gas when the solenoid closes the gas vent. The control is adapted to operate the solenoid in a manner that allows the gas vent to discharge gas for a limited amount of time.

The control may include a timer. The control opens the gas vent for a predetermined period of time established by the timer and closes the gas vent after the predetermined period of time. The period of time may be adjustable and the control includes a user input device to select a predetermined period of time for the timer.

The gas vent, the solenoid and the control may be physically joined in a packaged unit. The vent assembly may include a back pressure regulator or a factory set pressure relief valve, or the like (commonly referred to as a pressure regulator) that allows the gas vent to discharge gas at or above a particular gas pressure and to not discharge gas below that particular gas pressure. The vent assembly may include a valve that is adapted to vent gas and not water. The gas vent may include an orifice that is adapted to discharge gas at a controlled rate. The period of time may be at least several days and may be even a plurality of weeks.

Because the various aspects of the invention discontinues the venting of the contents of the piping network after a period of time, the inert gas source only continues to add inert gas needed to make up for leaks in the piping network. Because even the inert gas supplied by the inert gas source contains a certain amount of oxygen, the discontinuing of the supply of inert gas allows the small amount of oxygen remaining in the piping network to combine with the metal and be removed. This is an improvement over prior systems that continuously vent and thereby continue to introduce a certain amount of oxygen to the piping network indefinitely. Moreover, certain aspects of the invention allow this unique manner of operation in a compact assembly that can be added to the system in a straightforward manner.

These and other objects, advantages and features of this invention will become apparent upon review of the following specification in conjunction with the drawings.

DESCRIPTION OF THE PREFERRED EMBODIMENT

Figure 1:
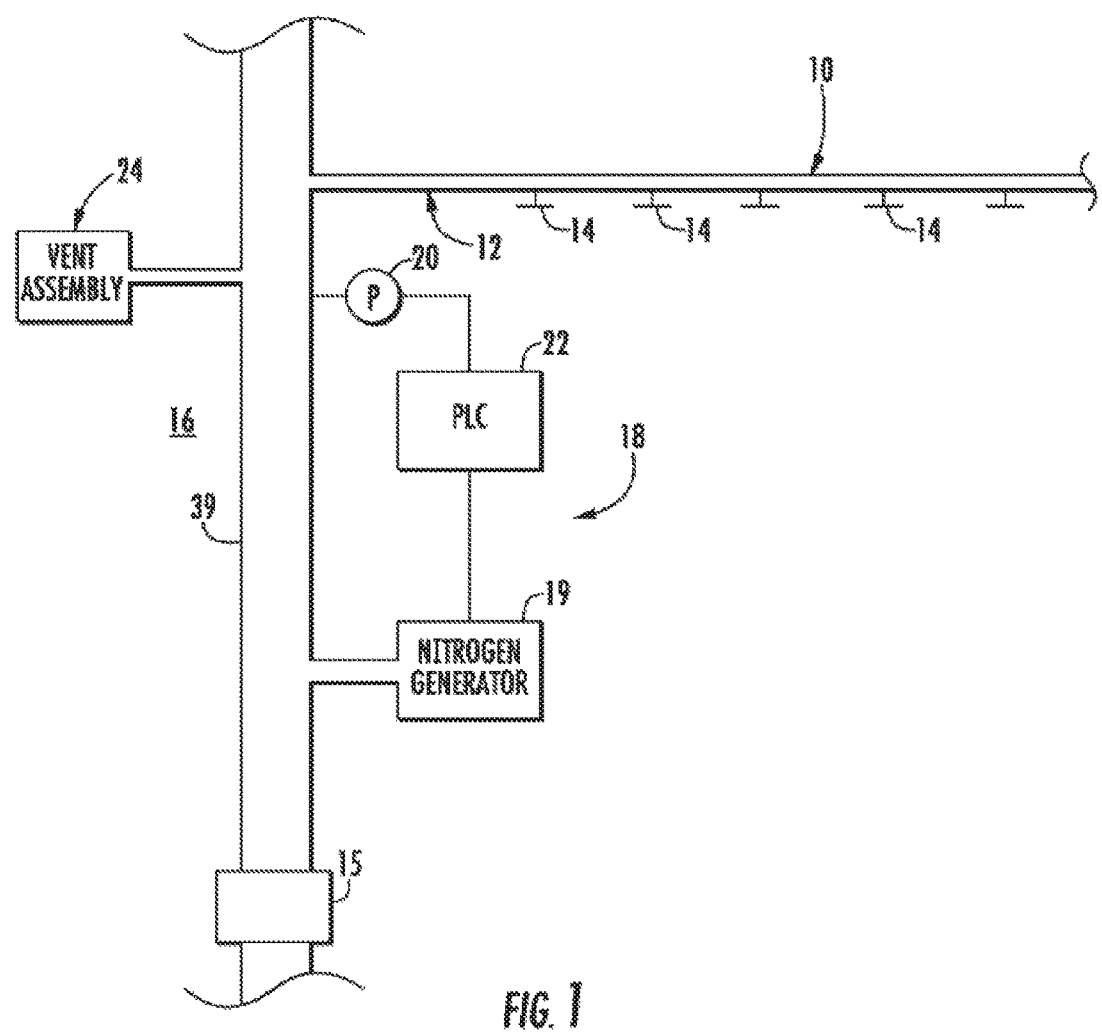
FIG. 1 is a block diagram of a fire protection sprinkler system with an inerting gas vent assembly and inerting system according to an embodiment of the invention.

Referring now to the drawings and the illustrative embodiments depicted therein, an inerting system 16 is adapted to inert a fire protection sprinkler system 10 having a piping network 12 and at least one sprinkler, which typically includes a plurality of sprinkler heads 14, connected with piping network 12 (FIG. 1). Fire protection sprinkler system 10 is a dry system, such as a pre-action system, a dry pipe system, or the like, having a dry or pre-action valve 15, which is well known in the art. Inerting system 16 reduces corrosion in fire protection sprinkler system 10 by significantly reducing oxygen in piping network 12 including replacing oxygen with inert gas, such as nitrogen.

Inerting system 16 includes an inert gas source 18 and an inerting vent assembly 24. Inerting system 16 may be any of the known type of sources, such as bottled nitrogen gas, plant nitrogen or various forms of inert gas generator, which is shown as a nitrogen generator 19. Inert gas source 18 further includes a control, such as a programmable logic controller (PLC) 22 and a pressure sensor 20 that provides an input to control 22 representative of the pressure within piping network 12. It should be understood that various types of controls, such as pneumatic pressure regulators and gas maintenance devices, could also be used.

Inerting vent assembly 24 includes a gas vent 26 that is adapted to discharge gas, a solenoid 28 and a control 30. Solenoid 28 is adapted to selectively open gas vent 26 and to close gas vent 26, such that gas vent 26 discharges gas when solenoid 28 opens the gas vent and does not discharge gas when solenoid 28 closes the gas vent. In the illustrated embodiment, gas vent 26 is in the form of an orifice 27 to regulate the rate of gas discharge and a housing around the orifice to interconnect with other pneumatic devices. Control 30 is adapted to operate solenoid 28 in a manner that allows gas vent 26 to discharge gas for a limited amount of time. This may be accomplished by control 30 being in the form of a timer, such as a high voltage (120 VAC) timer. Control 30 further includes an output 31 that is capable of switching solenoid 28 between an open and closed position and a power cord 32 that can either be hard wired into an AC power supply or a plug that can be inserted into an AC receptacle. While illustrated as a high voltage AC timer, control 30 may be operated from various voltage sources, a pneumatic source, or the like.

Control 30 is capable of being set to a variety of time durations and can be reset once the period of time has expired. Thus, the period of time may be adjustable in which case the control includes a user input device 34 to select a predetermined period of time for the timer. Alternatively, the period of time may be preset. Control 30 opens gas vent 26 for a predetermined period of time established by the timer and closes the gas vent after the predetermined period of time has lapsed. Factors that influence the length of time established by control 30 include the volume of piping network 12 and the discharge rate of the orifice in gas vent 26, which, in turn, may be selected based in part on the volume of piping network 12. The skilled artisan will be able to determine a period of time for control 30 to maintain vent 26 open in order to ensure that a sufficient level of inert gas is present in piping network 12. When control 30 closes vent 26, inerting system 16 will only supply inert gas to the piping network to make up for leaks therein. Because inert gas, which still contains a finite amount of oxygen, is no longer being constantly supplied to piping network 12, the oxygen that remains in the piping network will combine with the metal in the piping network and corrosion will no longer form in any appreciable amount.

In operation, when control 30 is reset to start the time period, solenoid 28 allows gas to escape piping network 12 through gas vent 26 at a reduced rate that is significantly less than the rate at which inerting system 16 can supply inert gas. Inert gas source 18 will be switched on by PLC 22 when the pressure sensed by pressure sensor 20 drops below a lower set-point, such as 20 PSIG, and switched off when the pressure rises to an upper set-point such as 25 PSIG. This results in the gas in piping network 12 increasing in proportion of inert gas and decreasing in proportion of oxygen. However, the proportion of oxygen does not go to zero because a finite amount of oxygen is contained within the inert gas supplied by inerting system 16. When the time period established by control 30 times out, control 30 closes solenoid 28 so that gas no longer is vented from piping network 12 through vent 26. What oxygen remains in the piping network combines with the metal forming the piping network such that the oxygen level becomes negligible and corrosion reaction essentially stops. PLC 22 continues to operate gas generator 19 as needed to maintain pressure in the dry fire protection sprinkler system to prevent water from entering the system, as is known in the art, but does not need to continue to supply gas to make up for that which is discharged by gas vent 26 during the time period established by control 30. The period of time will likely be measured in days or weeks and will be a function of at least the volume of piping system 12 and the flow rate of gas vent 26.

Figure 2:
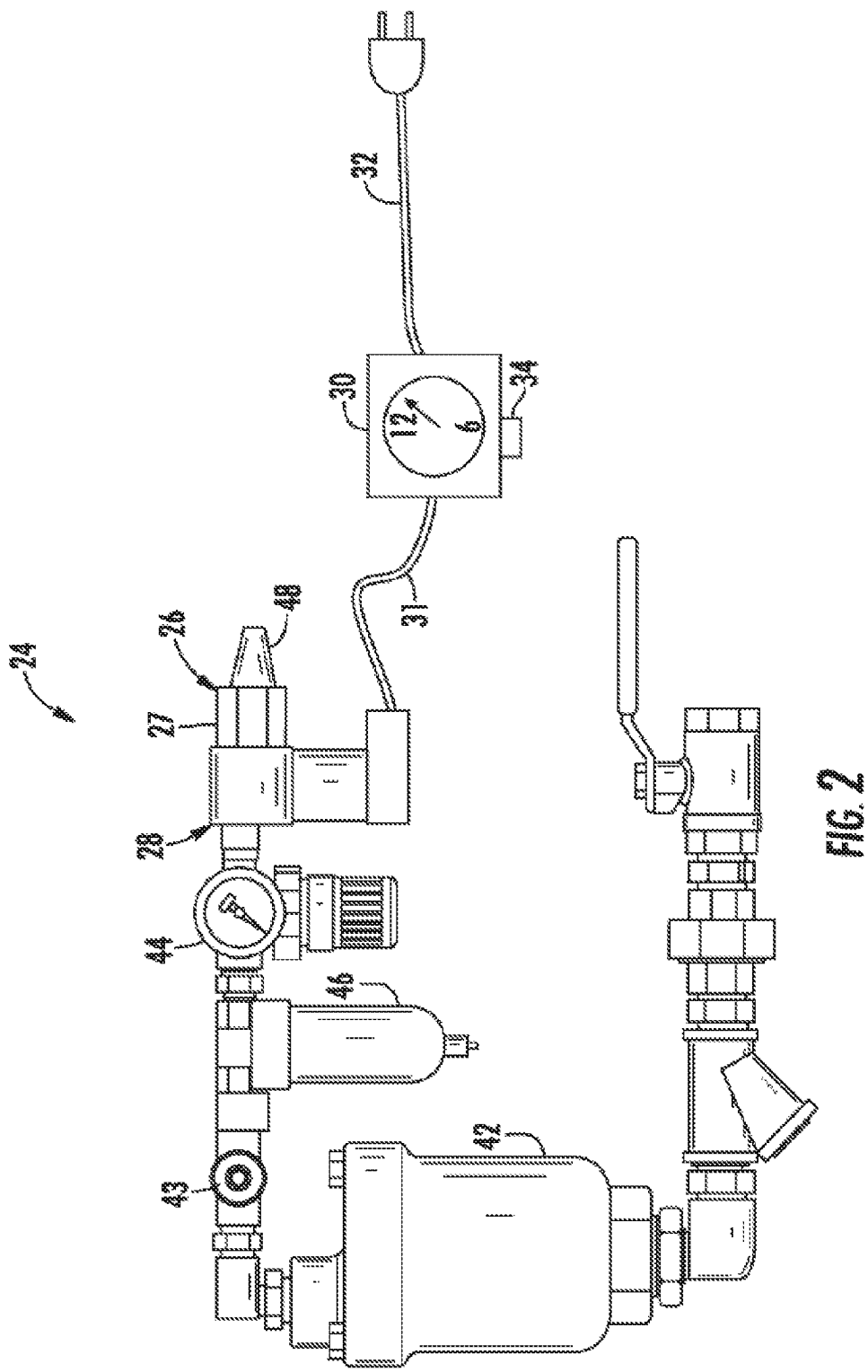
FIG. 2 is a side elevation of an inerting gas vent assembly.

In the illustrated embodiment, gas vent 26, solenoid 28 and control 30 are physically joined in a packaged unit, as is best seen in FIG. 2. This allows inerting vent assembly 24 to be connected with piping network 12 with minimal piping and wiring. While inerting vent assembly 24 may be connected at various locations on the piping network, it may be connected with the riser 39 of the piping network, which is typically located in a riser room and which is typically conveniently located for technicians to access. Thus, a technician can reset the time period established by control 30 in order to initiate an inerting period, such as when maintenance work has been carried out on piping network 12. Also, control 30 is more likely to be close to a source of electrical power in a riser room then elsewhere in the space protected by sprinkler system 10.

In the illustrated embodiment, inerting vent assembly 24 includes a back pressure regulator or factory set pressure relief valve 44 (which will be commonly referred to as a pressure regulator). Pressure regulator 44 allows gas vent 26 to discharge gas at or above a particular gas pressure and to not discharge gas below said particular gas pressure. In the illustrated embodiment, pressure regulator is set at a pressure below the cut-in pressure of gas generator 19, such as at 15 PSIG so that pressure regulator 44 is open and gas vent 26 is venting during the entire time period set by control 30. One purpose of pressure regulator 44 is to prevent high oxygen content air from being drawn into piping network 12 through vent 26 when the piping network is being emptied. Other devices may function in a similar manner, such as check valves or other one-way valves.

In the illustrated embodiment, inerting vent assembly 24 includes an air filter 46 to keep particles from clogging the orifice in gas vent 26 and a valve, such as a float-operated valve 42, that is adapted to vent gas and not water from the system. Thus, should the fire protection sprinkler system become flooded with water in response to a fire event, valve 42 will prevent water from passing through gas vent 26. Solenoid 28 includes a muffler 48, which reduces audible noise as well as prevents particles from entering the solenoid valve or orifice from the surrounding atmosphere. Vent assembly 24 further includes a sample port 43 that allows a gas analyzer (not shown) to determine the ratio of oxygen to inert gas in piping network 12.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiment of the invention in which an exclusive property or privilege is claimed are defined as follows:

1. An inerting system that is configured to inert a fire protection sprinkler system having a piping network and at least one sprinkler head connected with said piping network, said inerting system comprising:

an inerting vent assembly comprising a gas vent, a solenoid and a controller, said gas vent configured to discharge gas, said solenoid configured to close said gas vent, wherein said gas vent discharges gas when the gas vent is open and does not discharge gas when the gas vent is closed, and said controller including a timer for establishing a predetermined period of time, said controller configured to operate said solenoid to close said gas vent after the predetermined period of time established by said timer has elapsed; and an inert gas source, said inert gas source configured to supply inert gas to said piping network.

2. The inerting system as claimed in claim 1 wherein said controller is configured to open said gas vent for said predetermined period of time before closing the gas vent.

3. The inerting system as claimed in claim 2 wherein said predetermined period of time is adjustable.

4. The inerting system as claimed in claim 1 wherein said gas vent, said solenoid and said controller are physically joined in a packaged unit.

5. The inerting system as claimed in claim 1 including a pressure regulator, said pressure regulator allowing the gas vent to discharge gas at or above a particular gas pressure and not discharging gas below said particular gas pressure.

6. The inerting system as claimed in claim 1 including a valve, said valve configured to vent gas and not water.

7. The inerting system in claim 1 wherein said gas vent includes an orifice, said orifice configured to discharge gas at a controlled rate.

8. An inerting vent assembly for use with an inert gas source to inert a fire protection sprinkler system having a piping network and at least one sprinkler head connected with said piping network, said inerting vent assembly comprising:
   a gas vent that is configured to discharge gas;
   a solenoid that is configured to close said gas vent, wherein said gas vent discharges gas when the gas vent is open and does not discharge gas when the gas vent is closed; and
   a controller including a timer for establishing a predetermined period of time, said controller configured to operate said solenoid to close said gas vent after the predetermined period of time established by said timer has elapsed.

9. The vent assembly as claimed in claim 8 wherein said controller opens said gas vent for said predetermined period of time before closing the gas vent.

10. The vent assembly as claimed in claim 9 wherein said predetermined period of time is adjustable.

11. The vent assembly as claimed in claim 8 wherein said gas vent, said solenoid and said controller are physically joined in a packaged unit.

12. The vent assembly as claimed in claim 8 including a pressure regulator, said pressure regulator allowing the gas vent to discharge gas at or above a particular gas pressure and not discharging gas below said particular gas pressure.

13. The vent assembly as claimed in claim 8 including a valve, said valve configured to vent gas and not water.

14. The vent assembly as claimed in claim 8 including an orifice, said orifice configured to discharge gas at a controlled rate.

15. The vent assembly as claimed in claim 8 wherein said controller includes a user input device to select the predetermined period of time for said timer.

16. The vent assembly as claimed in claim 15 wherein said predetermined period of time is adjustable.

17. The vent assembly as claimed in claim 16 wherein said controller includes a programmable logic controller.

18. The vent assembly as claimed in claim 16 including a valve, said valve configured to vent gas and not water.

19. The vent assembly as claimed in claim 18 including a pressure regulator, said pressure regulator allowing the gas vent to discharge gas at or above a particular gas pressure and not discharging gas below said particular gas pressure.

20. The vent assembly as claimed in claim 19 wherein said controller opens said gas vent for said predetermined period of time before closing the gas vent.

21. The inerting system as claimed in claim 1 wherein said controller includes a user input device to select the predetermined period of time for said timer.

22. The inerting system as claimed in claim 2 wherein said controller includes a programmable logic controller.

23. The inerting system as claimed in claim 2 wherein said controller includes a user input device to select the predetermined period of time for said timer.

24. The inerting system as claimed in claim 23 wherein said predetermined period of time is adjustable.

25. The inerting system as claimed in claim 24 including a valve, said valve configured to vent gas and not water.

26. The inerting system as claimed in claim 25 including a pressure regulator, said pressure regulator allowing the gas vent to discharge gas at or above a particular gas pressure and not discharging gas below said particular gas pressure.

\* \* \* \* \*